Oct. 22, 1968 R. B. HAILSTONE 3,407,131
PROCESS OF TREATING POLYVINYLBUTYRAL SHEETING BY AN
ELECTRIC DISCHARGE TO REDUCE BLOCKING
Filed Oct. 27, 1966 2 Sheets-Sheet 1
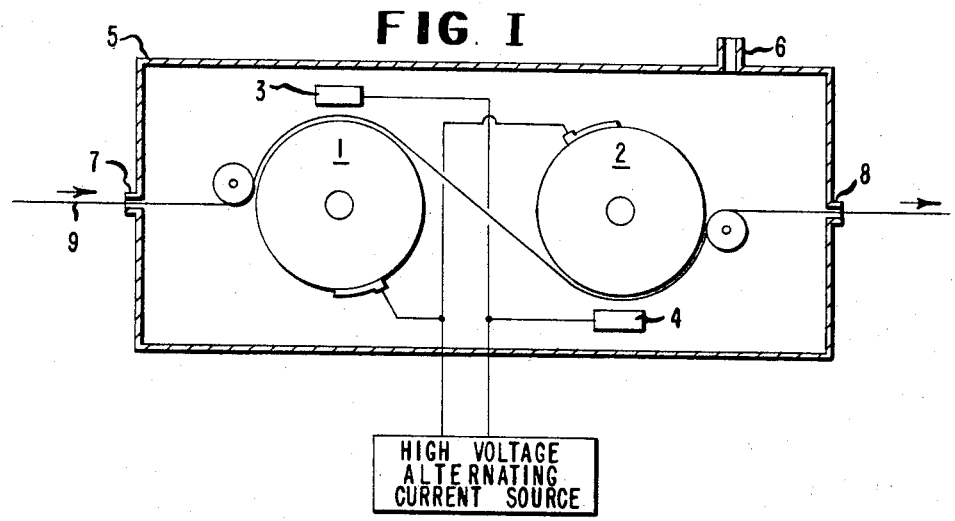
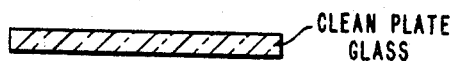
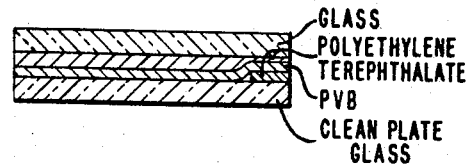
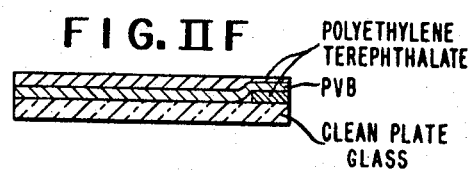
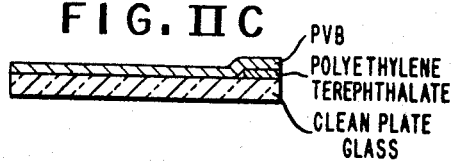
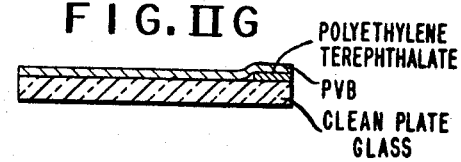
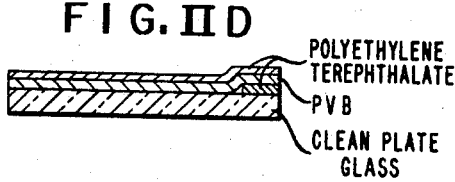
INVENTOR
ROBERT B. HAILSTONE
BY Earl L. Handley
ATTORNEY Oct. 22, 1968
R. B. HAILSTONE
3,407,131
PROCESS OF TREATING POLYVINYLBUTYRAL SHEETING BY AN
ELECTRIC DISCHARGE TO REDUCE BLOCKING
Filed Oct. 27, 1966
2 Sheets-Sheet 2
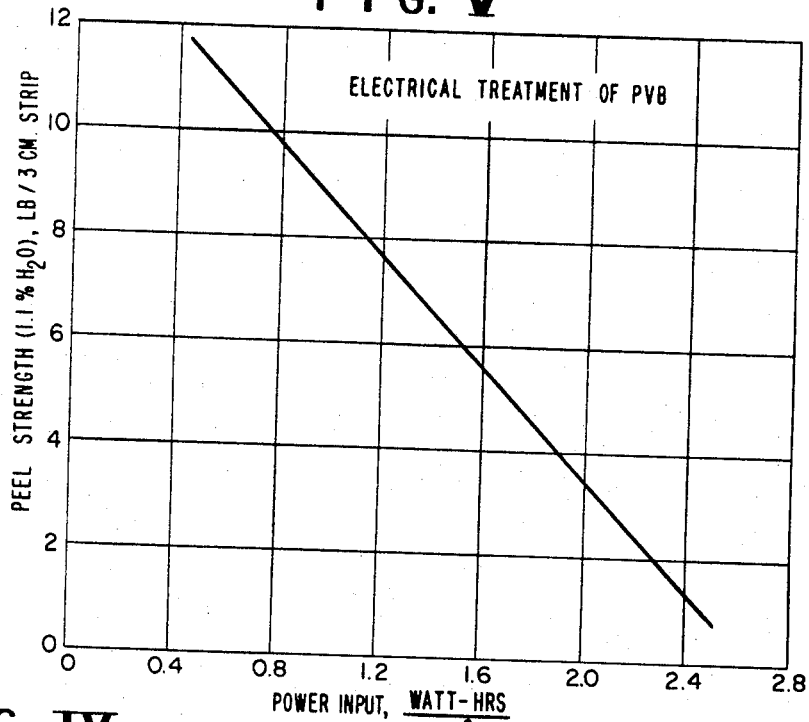
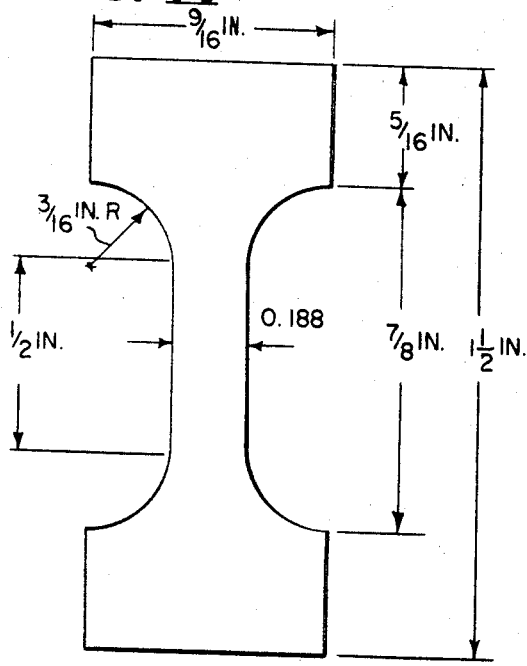
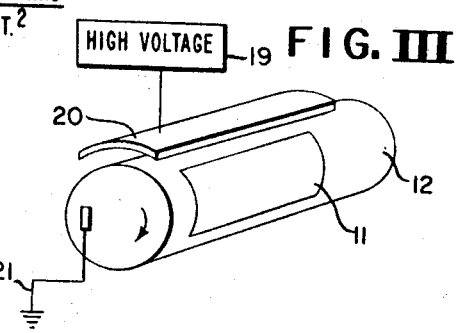
INVENTOR
ROBERT B. HAILSTONE
BY *Earl L. Handley*
ATTORNEY

United States Patent Office 3,407,131
Patented Oct. 22, 1968

3,407,131
PROCESS OF TREATING POLYVINYLBUTYRAL SHEETING BY AN ELECTRIC DISCHARGE TO REDUCE BLOCKING
Robert Burleigh Hailstone, Wilmington, Del., assignor to E. I. du Pont de Nemours and Company, Wilmington, Del., a corporation of Delaware
Continuation-in-part of applications Ser. No. 296,655, July 22, 1963, and Ser. No. 521,600, Jan. 19, 1966. This application Oct. 27, 1966, Ser. No. 589,938
5 Claims. (Cl. 204—165)

This application is a continuation in part of application Ser. No. 296,655 filed July 22, 1963, now U.S. Patent No. 3,282,722 and application Ser. No. 521,600 filed Jan. 19, 1966.

This invention relates to an improved polyvinyl butyral sheeting for use in laminated safety glass and, more specifically, to sheeting which when it contains relatively low amounts of moisture may be laminated to form safety glass having a high resistance to penetration. This invention also relates to a polyvinyl butyral sheeting which has improved handling characteristics because of the reduced tendency of the sheeting to adhere to itself when stored in rolls or stacks. In addition, this invention relates to a method for treating polyvinyl butyral sheeting to produce an interlayer for safety glass having these desirable characteristics, and, more specifically to electrical discharge treatment of polyvinyl butyral sheeting. This invention also relates to laminates produced using the improved polyvinyl butyral sheeting of this invention, and more particularly, to windshields and the like, containing the improved sheeting.

It is known to employ plasticized polyvinyl butyral sheeting as an interlayer for safety glass. It is also known that the adhesion of the sheeting to the glass is related to the moisture content of the sheeting and that resistance to penetration of the safety glass laminate is related to the adhesion between the sheeting and the glass.

The relationship between moisture content of the sheeting and resistance to penetration of a laminate can be readily demonstrated if the resistance to penetration of a safety glass laminate prepared using a sheeting containing 0.3 percent by weight water is compared with the resistance to penetration of a laminate prepared from a sheeting containing about 1.6 percent by weight water. The resistance penetration of the laminate containing 0.3 percent water will be markedly less. However, the use of high moisture content sheeting is not entirely satisfactory since the high moisture content makes the sheeting more susceptible to the formation of bubbles, and also reduces the stiffness of the sheeting and increases its tackiness, thus adversely affecting the handling characteristics of the sheeting.

It is also known that the adhesion of the interlayer to the glass can be decreased by synthesizing polyvinyl butyral having a lower hydroxyl content, i.e., a smaller amount of unreacted polyvinyl alcohol present in the resin chain. However, this reduction in adhesion between the glass and interlayer does not significantly affect the resistance to penetration of the laminate, for by reducing the hydroxyl content, the tensile strength of the interlayer is reduced, thereby substantially cancelling any improvement in resistance to penetration obtained by the decrease in adhesion.

It is an object of this invention to provide a polyvinyl butyral sheeting that may be laminated to form safety glass having a high resistance to penetration even when the sheeting has a low moisture content. A further object of this invention is to provide a plasticized polyvinyl butyral sheeting which has a decreased tendency to block. It is a further object of this invention to provide a plasticized polyvinyl butyral interlayer which has a low adhesion to glass. Another object of this invention is to provide methods for the production of the plasticized polyvinyl butyral sheeting which exhibits the above desirable characteristics. A further object of this invention is to provide a windshield containing the improved interlayer of this invention. Other objects will be apparent to one skilled in the art from the remainder of the specification.

It has been discovered that the above objects can be achieved by subjecting plasticized polyvinyl butyral sheeting to an electrical discarge treatment.

In the drawing, FIGURE I diagrammatically illustrates an apparatus that may be used to carry out the electrical discharge treatment on a continuous sheet.

FIGURE II shows diagrammatically the steps of laminating the sheeting of this invention for testing the adherence of the sheeting to glass.

FIGURE III shows diagrammatically an apparatus that may be used to treat a single piece of sheeting by electrical discharge.

FIGURE IV shows the shape of a test sample for testing the tensile strength of polyvinyl butyral sheeting.

FIGURE V graphically shows how power input typically is related to peel strength in an electrical discharge treated sample.

The process of the present invention may readily be carried out in an apparatus such as that illustrated in the FIGURE I. As shown in FIGURE I, the apparatus comprises two electrode rolls 1 and 2 connected to one side of a regulatable high voltage alternating current source and two spaced electrodes 3 and 4 connected to the other side of a high voltage alternating current source. The sheeting 9 to be treated is fed from an extruder or other source (not shown) through inlet 7 and passes over the surface of the electrode rolls, and as it moves between the electrodes is subjected to an electrical discharge whereby the surface of the sheeting is modified. The sheeting then passes through outlet 8, and may then be rolled for storage. The entire electrode system may be enclosed in a container 5 which is connected to a source of a particular gas so that the entire container may be swept with that gas introduced through aperture 6. Instead of employing the apparatus disclosed in the figures, the sheeting may also be treated using an apparatus in which the sheeting passes in contact with a flat electrode and between that electrode and another spaced flat electrode. Other apparatus for carrying out the process of this invention will also be apparent to one skilled in the art.

In FIGURE III plasticized polyvinyl butyral sheeting 11 is mounted on internally cooled roller 12, by means of suitable adhesive strips, not shown. The roller electrode is grounded by means 21. High voltage 19 is applied from a source to internally cooled electrode 20, shown in the drawing to be shaped, but not necessarily shaped. In the preferred embodiment, electrode 12 and sheeting 11 are separated by a thin buffer layer of high dielectric strength material such as a 4 to 6 mil film of polyethylene terephthalate sold under the trademark "Mylar," not shown.

It is not fully understood what change in the surface takes place during treatment of the sheeting, for chemical analysis and physical testing indicate that only a very thin layer between about 50 and 5000 Angstroms thick is affected by the treatment. Because of the thinness of the affected layer, precise chemical and physical analyses are very difficult to obtain. It has been found that a greater amount of material insoluble in p-dioxane, methanol, and dimethylformamide is found in the affected surface layer than is present in the bulk of the sheeting. Examination of this insoluble material from the surface of the sheeting by infrared absorption analysis indicates increased absorption at a wavelength of 5.77 microns, which is characteristic of increased ester carbonyl content. Similiar evidence is obtained through examination of the surface of the treated sheeting with attenuated total reflectance infrared absorption techniques. In any event the change in the surface is measurable in terms of the adhesion of the treated sheeting to glass, and in terms of the tendency of treated sheeting to block.

There is a definite relationship between the adherence to glass of an interlayer of a given tensile strength and the resistance to penetration of the glass laminate, i.e., the energy absorption capacity of the laminate. It is believed that a low adherence of the interlayer to the glass allows the interlayer to separate from the glass laminate in areas adjacent to cracks when the laminate is subjected to sufficient impact to break the glass; consequently, the interlayer gives or stretches adjacent to the point of impact due to a pulling of the interlayer from between the glass in a small area adjacent to the cracks emanating from the point of impact. Thus the impact is absorbed in a much larger area of interlayer than it would be if the glass were more firmly bound to the polyvinyl butyral.

In order to equate the adherence of polyvinyl butyral to the surface treatment, the following adherence test was devised. A 12 in. x 12 in. sheet of plate glass is thoroughly cleaned with detergent and thoroughly washed with demineralized water (FIGURE IIa). A 1 mil polyethylene terephthalate film 12 in. x 12 in. is placed across the width of the glass at one end (FIGURE IIb). A 12 in. x 12 in. sheet of polyvinyl butyral of known thickness having a predetermined moisture content is then placed on top of the glass in such a manner that it overlapped the polyethylene terephthalate film (FIGURE IIc). A 5 mil 12 in. x 12 in. sheet of polyethylene terephthalate is then placed over the polyvinyl butyral (FIGURE IId). A 12 in. x 12 in. sheet of glass is then placed over the polyethylene terephthalate film (FIGURE IIe). The resulting laminate is run through nip rolls at a pressure of 53 lbs./linear inch of width at room temperature, heated to 50° C. by placing it for 1 minute in a 200° C. circulating air oven, passed again through nip rolls, heated to 90° C. by placing it in a circulating air oven for 3 minutes at 200° C., passed through nip rolls and autoclaved in oil for 30 minutes at 150° C. and 225 p.s.i.g. The glass cover is removed, the specimen is washed free of oil, and held at constant temperature of 22° C. for 8 hours (FIGURE IIf). The 12 in. x 12 in. sheet is then cut into strips 3 cm. wide and 12 in. long. The upper layer of polyethylene terephthalate is removed, (FIGURE IIg) and the peel strength determined by peeling the interlayer at a temperature of 22° C. from the glass at an angle of 180° using an Instron testing machine at a cross-head speed of 20 in./min. (FIGURE IIh). Peel strength is defined as the average equilibrium force required to peel the three centimeter wide strip of interlayer from the glass.

It is well known that the measured adhesion in such a test will be influenced by the thickness of the specimen of sheeting on which the measurement is made. While this invention is not restricted to sheeting of any particular thickness, it, nevertheless, is convenient to normalize the results of the adhesion measurement to sheeting of a standard reference thickness. By so doing, the reported adhesion measurement thereby provides a characterization of the surface of the sheeting and is independent of the thickness of the particular sample employed in the test. For the present purpose, 15 mils has been selected as the reference thickness for reporting results of the adhesion test since this is a thickness in which polyvinyl butyral sheeting is commonly available commercially.

The adhesion of polyvinyl butyral sheeting of any thickness $t$ may be normalized to the reference thickness of 15 mils by use of the expression $$A_{15} = A_t (15/t)^{0.65}$$

where $A_{15}$ = adhesion normalized to a reference 15 mil thickness, $A_t$ = adhesion measured on sheeting of thickness $t$, and $t$ = thickness of the sheeting in mils.

This expression has been established by measuring the adhesion of composite sheeting prepared from multiple layers of 15 mil thick sheeting, both untreated and treated by the process of this invention to various levels of adhesion. This expression is valid over the range of about 10 to 100 mils. All adhesion measurements reported hereinafter have been normalized to a sheeting thickness of 15 mils.

The sheeting of this invention has on one or both sides a normalized adhesion to glass of between about 1 and about 9 lbs. pull per 3 cm. strip at a moisture content of 0.3 percent by weight water when laminated and tested under the conditions specified in the adherence test. The sheeting of this invention has a normalized adherence to glass of between 1 and 9 lbs. pull per 3 cm. strip throughout the moisture content range of 0.2 to 1.4 percent by weight water. Any preselected value for adhesion from 1 to 9 lbs. per 3 cm. strip can be obtained through adjustment of the treating conditions.

In order to demonstrate the difference in resistance to penetration of safety glass laminates, the following laminate preparation procedure and head-form impact test are employed.

Untempered plate glass of nominal 0.125 in. thickness, 14¼ in. wide by 43¼ in. long is washed thoroughly with a detergent solution at a temperature of about 150° F. The washed glass is rinsed with demineralized water and is dried.

The polyvinyl butyral sheeting of known thickness to be used in the laminate is cut to a size of 14¼ in. x 43¼ in., and is washed thoroughly to remove sodium bicarbonate powder and any contamination from the surface. The sheeting then is rinsed with demineralized water. The surface moisture on the sheeting is removed by suspending the sheeting at about 20° C. in a 20–50 percent relative humidity atmosphere until the surface is dry. The sheeting is conditioned at 70° F. in an appropriate relative humidity environment until the desired moisture content is obtained in the sheeting.

The sheeting at temperature of about 70° F. is laid between two pieces of the previously washed and dried glass to form a sandwich. The glass temperature during this operation normally is about 130° F. because of residual heat in the glass from the washing operation.

The sandwich is passed through a pair of rubber covered rolls in order to provide a preliminary bond between the interlayer and the glass. The roll pressure is maintained as high as possible without causing the glass to crack. The maximum pressure which can be used depends upon the softness of the rubber roll and the flatness of the glass. Typically, the rolls are adjusted to exert a force of from 10 to 60 pounds per lineal inch of contact with the glass. The rolled sandwich, commonly called a prepress, is placed in an oven for a length of time sufficient to bring the temperature of the glass to 170° F. The heated prepress then is again rolled in a manner identical to that previously described.

The finished prepress is placed in an air autoclave in which it is heated to a temperature of 150° C. The rate of heating is adjusted so that approximately 75 minutes are required to bring the autoclave up to the temperature of 150° C. The pressure in the autoclave is increased to 50 p.s.i. as soon as the autoclave is closed after the laminate is inserted. The pressure is increased to 150 p.s.i. when the temperature reaches 100° C. The temperature is maintained at 150° C. for 30 minutes after which time the temperature is reduced over a period of 55 minutes to about 20° C. at which time the pressure is reduced and the laminate is removed from the autoclave.

The head-form impact test consists of dropping a 22 lb. hardwood missile from various heights onto the center of the 14¼ in. x 43¼ in. laminate. The missile is in the shape of a human head 7⅝ in. in diameter with an attached wooden beam 18 x 4 x 4 inches long representing the shoulders. The head-form is padded with one wrap of ⅛-in. thick felt. The laminate is supported solely by its outer 1 9/16 in. edges in a horizontal position by a flat rubber gasket 1 9/16 in. wide and ¼ in. thick, having a durometer hardness of 45–55. The rubber gasket is supported on a steel frame. An identical rubber gasket is placed on top of the laminate, and a mating metal frame clamped securely in place by 4 C clamps, spaced near the corners of the frame. Two 29 lb. weights are placed on the top frame. These weights aid in holding the mated metal frames together. By this clamping method the laminate will not pull from between the rubber gaskets when they are impacted with the 22 lb. missile from a height of about twenty feet.

The procedure used in conducting the impact tests is as follows:

(1) The laminates are conditioned in a circulating water bath for four hours at 20° C.

(2) The support frame is cleaned of any glass particles.

(3) An initial drop height is selected based on the expected break point of the material under test.

(4) The laminate is removed from the conditioning bath, placed in the frame, and the missile immediately dropped.

(5) The tested laminates are graded as "penetrations" whenever the missile passes through the laminate or whenever the glass has cracked and the plastic interlayer has torn along the crack in a radial direction from the point of impact for a distance of more than about 5 inches. Other cases are graded as "supports."

(6) If a test results in a "penetration," the succeeding test is from a height lower by an interval I than the first test. If a test results in a "support," the next test is from a height higher by I feet. The interval I is generally chosen to be four ins. for this test.

(7) At least 15 identically prepared laminates normally are tested.

The 50 percent penetration height, i.e., the height at which 50 percent of the laminates are penetrated, is calculated in the following manner:

$$\bar{X} = H_0 + I\left(\frac{\epsilon i N}{\epsilon N} + \frac{1}{2}\right)$$

if supports are tabulated.

$$\bar{X} = H_0 + I\left(\frac{\epsilon i N}{\epsilon N} - \frac{1}{2}\right)$$

if penerations are tabulated.

where:

$\bar{X}$ = 50% penetration height,
$H_0$ = the lowest height tested,
$I$ = height interval used,
$i$ = integer corresponding to height intervals (0 at $H_0$, 1 at $H_1$, etc.),
$N$ = number of supports or penetrations at each interval.

The formula for supports is used when there are fewer supports than penetrations; the formula for penetration is used when there are fewer penetrations than supports.

The 50 percent penetration height of a laminate is dependent upon the thickness of the interlayer that is employed, as well as being dependent upon the adhesion between the interlayer and the glass. As expected, the penetration height is increased as the interlayer thickness in increased. This invention is not restricted to sheering of any particular thickness, and the process of this invention may be applied to sheeting of a wide range of thicknesses. Typically, the thickness of the sheeting will range from about 10 mils to about 60 mils; however, the sheeting of this invention is not limited to this range of thickness.

The sheeting of this invention when laminated at a moisture content of 0.3 percent by weight water, and tested under the conditions specified in the head-form impact test, has, at a tensile strength between about 2500 and 6000 p.s.i., a 50 percent penetration height which is related to thickness in accordance with the equation:

$$PH \geqslant 15.9 e^{0.0555t}$$

wherein

PH = the 50% penetration height in inches,
$e$ = base of natural logarithms,
$t$ = interlayer thickness in mils.

Furthermore, the sheeting of this invention has a 50% penetration height which is given by this equation throughout the moisture content range of 0.2 to 1.4 percent by weight water. The penetration height can be controlled by adjustment of the treating conditions to any preselected value up to about $48e^{0.0555t}$.

The sheeting of the invention has the further characteristic of having a decreased tendency to block. "Blocking" is the tendency of sheets to adhere to each other. Blocking is measured by the force required to pull apart clean (powder free) sheets of a specified surface pattern and known thickness at a constant rate of 20 inches per minute that have been stored at 20° C. at a relative humidity of 18% under a load of 0.36 p.s.i. for 30 minutes. The degree of blocking is expressed herein as the average force required to peel the specimens apart per inch of width.

Blocking is dependent upon the surface pattern of the sheeting as well as the physical-chemical properties of the surface. Commercially available sheeting has a wide variety of surface patterns. In order to accurately determine the effects of physical and chemical properties on blocking, it is convenient to standardize the effect of surface pattern; this is accomplished by measuring blocking on a polyvinyl butyral sheeting that has been pressed smooth. Measurements of blocking can be carried out on sheeting which has not been pressed smooth, and the blocking measurement will change with the degree of treatment in the same direction as it does for smooth sheeting.

In order to produce the smooth surface on the sheeting samples to be used for measuring blocking, the sheeting is placed between two layers of 5 mil thick polyethylene terephthalate film sold under the trademark "Mylar," having smooth surfaces, which in turn is placed between two layers of ¼ in. thick glass. The sandwich of glass, polyethylene terephthalate and polyvinyl butyral is then placed in an autoclave under oil at a pressure of 225 lbs. per square inch and a temperature of 138° C. for a hold period of nine minutes. After removing the laminate from the autoclave, the glass and polyethylene terephthalate film are separated from the polyvinyl butyral sheeting and discarded. Any surface pattern originally present on the polyvinyl butyral sheeting is pressed smooth by this treatment. The blocking of the smooth sheeting is then measured as described previously.

The sheeting of this invention has a blocking which varies with thickness according to the following equation:

$$B \leqslant 0.10 e^{0.0203t}$$

where

B = blocking, pounds per in. of width,
$e$ = base of natural logarithms,
$t$ = sheeting thickness, mils.

when measured under the conditions specified in the blocking test. The blocking can be controlled by adjustment of the treating conditions, to any preselected value down to about 0.002 pound per inch of width. The blocking measurements set forth herein for the sheeting of this invention are obtained by treating the sheeting and then pressing it smooth.

The electrical discharge treatment may be carried out using an apparatus such as that shown in FIGURE III, or alternatively, the sheeting may be passed between multiple pairs of spaced electrodes each similar to those shown in FIGURE III, or over a single electrode about which are located a multiplicity of electrodes. In any event, the voltage can vary from about 1000 to about 20,000, and the frequency from about 3000 cycles to about one megacycle. The amount of electrical energy to which the sheeting is subjected is believed to be the most significant feature of the treatment. It has been found that between about .025 and 8 watt hours per square foot of sheeting produces the desired effect. Preferably, between about .2 and 2.6 watt hours of power are used to treat each square foot of sheeting. FIGURE V graphically illustrates how power input is related to peel strength of a sample containing 1.1% water. The gap between the non-roller electrode and the plasticized polyvinyl butyral sheeting of FIGURE III can vary between about 10 and 100 mils. The speed at which the sheeting is passed between the electrodes can vary over wide limits, for example speeds between 2 and 500 feet per minute have been found satisfactory.

The electrical discharge treatment may be carried out in air or in the presence of an inert atmosphere such as helium, argon or nitrogen or a reactive atmosphere such as ammonia or carbon dioxide. Mixtures of air and nitrogen can also be employed. The results will vary somewhat in different atmospheres.

Any polyvinyl butyral resins, for example those disclosed in U.S. Patent 2,345,946 to Overbaugh dated Apr. 4, 1944; U.S. Patent 2,442,754 issued to Stamatoff on June 24, 1947; and in U.S. Patent 2,946,711 issued to Bragaw et al. on July 26, 1960, can be satisfactorily treated by the process of this invention. Typically, the resin sheet has a hydroxyl content of 17 to 25 percent, expressed as weight percent of polyvinyl alcohol and contains a plasticizer in the amount of 20 to 50 parts per 100 parts by weight of the polyvinyl butyral. Preferably, the hydroxyl content is 20 to 24 percent, and the amount of plasticizer is 41 to 48 parts. Typical suitable plasticizers are triethylene glycol di 2 ethyl butyrate; dibutyl sebacate; dibutyl "Cellosolve" adipate and triethylene glycol dihexoate.

The plasticized polyvinyl butyral resin may be treated immediately after it is formed, or the polyvinyl butyral resin sheet may be treated after it is relaxed in accordance with the process disclosed in the U.S. Patent 3,068,525 issued to Linton and Munger on Dec. 18, 1962, or the polyvinyl butyral sheeting may be treated at any time prior to being used to form safety glass laminates, in which case the surface treatment may be carried out on a powdered surface: sodium bicarbonate, diatomaceous earth, or other suitable powders in amounts up to 15 percent by weight of the sheet are conventionally applied to allow easy separation of the sheeting. The process may also be carried out on dyed or pigmented plasticized polyvinyl butyral sheeting without significant modification of the process. Surface treatment of only one side of the sheeting is effective in obtaining the objects of this invention, only to a more limited degree than treatment on both sides.

In the following examples, which illustrate the invention, all parts and percentages are by weight and all electrical discharge treatments were made in air unless otherwise stated.

Example I

Fifteen mil polyvinyl butyral sheeting the resin content of which contains 22.5% hydroxyl expressed as weight percent of polyvinyl alcohol, was treated in a high voltage electrical discharge apparatus similar to that shown in FIGURE III.

The electrode 20 was a concave shaped brass electrode 30 inches long and 3 inches wide, and the treatment roll is wrapped with a 4 to 6 mil buffer layer of polyethylene terephthalate film. The above sheeting was treated under the following conditions.

Sheeting speed, f.p.m. _____ 10
Frequency, kilocycles _____ 9
Input power, watts _____ 2000
Air gap between electrode and sheeting, mils _____ 30
Treatment roll temp., ° C. _____ 20

The sheeting passed under the electrode 15 once and absorbed about 1.33 watt hours of energy per square foot.

In this treatment the sheeting width extended one inch or more beyond each end of the electrode to prevent electrical arcing from the end of the electrode to the treatment roll. The following change in properties resulted from this treatment:

|  | Before Treatment | After Treatment |
|---|---|---|
| Peel strength, lbs./3 cm. strip at 0.4% moisture | 12.0 | 5.6 |
| Blocking, lbs. per in. of width | 0.65 | 0.056 |
| 50% penetration height, at 0.4% moisture (inches) | 27 | 55 |

Example II

The untreated sheeting of Example I was treated by the method described in Example I over a range of sheeting speeds and power output levels. The results of this treatment on peel strength are given in FIGURE V where peel strength is correlated with power input per square foot of sheeting.

Example III

The untreated sheeting of Example I was treated under the conditions of Example I except that sheeting speed was decreased to 9 feet per minute. The sheeting in one pass under the electrode absorbed about 1.48 watt hours of energy per square foot. This treatment resulted in the following changes in properties of the sheeting.

|  | Untreated Sheeting | Treated Sheeting |
|---|---|---|
| Peel Strength, lbs./3 cm. strip at 0.4% moisture | 12.0 | 4.5 |
| Blocking lbs. per in. of width | 0.65 | 0.046 |
| 50% penetration height at 0.4% moisture (inches) | 26 | 96 |

Example IV

The untreated sheeting of Example I was treated with the electrical discharge of a high frequency Tesla coil generator under the following conditions:

Electrode: ½ in. aluminum rod 16 inches long
Treatment roll: 6 in. diameter roll covered with 12–15 wrap of 2 mil polyethylene terephthalate film
Electrode-sheeting air gap: 0.100 in.
Power input: 1200 watts
Sheeting speed: 13.7 ft./min.

The sheeting was passed one time under the electrode and absorbed about 1.17 watt hours of energy per square foot. This treatment reduced the peel strength of the sheeting at a moisture content of 0.4% moisture from 12.0 lbs./3 cm. strip for untreated to 6.6 lbs./3 cm. strip for the treated sheeting.

Example V

The untreated sheeting of Example I, some of which powdered with 8 to 11% sodium bicarbonate powder and some of which rinsed free of powder, was treated under conditions described in Example I except that sheeting speed was varied over a four-fold range. The results of this treatment on peel strength are shown in the following table:

| Sheeting Speed, f.p.m. | Power Input Watt, hours/ft. | Peel Strength At 0.4% Moisture | |
|---|---|---|---|
| | | Unpowdered Sheeting | Powdered Sheeting |
| 5.5 | 2.91 | | 5.8 |
| 10.3 | 1.17 | 5.0 | 6.6 |
| 19.4 | 0.83 | 6.0 | 8.8 |

In a preferred embodiment of this invention it is desirable to coat one or both electrodes with a dielectric material so that in case the polyvinylbutyral sheeting is not of uniform thickness or contains perforations, there will not be a direct arcing between electrodes. The dielectric coating may take the form of a ceramic coating on the electrodes or it may be a layer of high dielectric strength plastic material such as polyethylene terephthalate. Such dielectric coatings are not, of course, necessary.

In Examples 6 to 33 the plasticized polyvinylbutyral sheeting employed was a commercially available product of 0.015 inch thickness and of 15 inches width, having a grooved or serrated surface pattern in which the height of the serrations is about 0.0005 inch, and a blocking measured as above defined, i.e. 20° C. at 20 p.s.i. load for 30 minutes when not subjected to any treatment, of 4270 millilb./in. The electrode arrangement was generally similar to that shown in the FIGURE I, except that only one roller type electrode was employed. Thus, only one side of the sheet was treated in any one pass through the system. The roller electrode was made of stainless steel and about 14 inches in diameter and about 18 inches long. The non-roller electrode(s) was also stainless steel and had a flat surface 2 inches wide and 14 inches long, which surface was centrally mounted next to the roller electrode such that the electrode(s) extended 2 inches in the machine direction. The electrode(s) was coated with about 50 mil of baked-on ceramic and water cooled by internal tubing. In all cases the blocking was measured between two treated surfaces. In Examples 6 through 26 and 28, the treatment was carried out in the presence of a nitrogen atmosphere. Except as otherwise noted, the electrical frequency was 10 kilocycles, and the sheet moved at a speed of 30 feet per minute. In Examples 17 to 22 two non-roller electrodes were mounted about .5 inch apart spaced adjacent the roller electrode, and in Examples 23 to 31 three non-roller electrodes were mounted about .5 inch apart spaced adjacent the roller electrode. In all other examples only one non-roller electrode was employed.

TABLE I

| Example Number | Watt hrs./ sq. ft. | Volts | Sheeting-to-Electrode Gap, inch | Blocking millilb./in. |
|---|---|---|---|---|
| 6 | .044 | 4,000 | 0.010 | 240 |
| 7 | .072 | 4,500 | 0.010 | 65 |
| 8 | .090 | 5,000 | 0.010 | 65 |
| 9 | .138 | 6,000 | 0.010 | 57 |
| 10 | .0595 | 4,000 | 0.0183 | 192 |
| 11 | .079 | 4,500 | 0.0183 | 81 |
| 12 | .1 | 5,000 | 0.0183 | 77 |
| 13 | .124 | 5,500 | 0.0183 | 55 |
| 14 | .088 | 4,500 | 0.0308 | 270 |
| 15 | .103 | 5,000 | 0.0308 | 200 |
| 16 | .12 | 5,500 | 0.0308 | 100 |

TABLE II

| Example Number | Watt hrs./ sq. ft. | Volts | Sheeting-to-Electrode Gap, inch | Blocking millilb./in. |
|---|---|---|---|---|
| 17 | .0385 | 3,000 | 0.0203 | 98 |
| 18 | .079 | 3,500 | 0.0203 | 25 |
| 19 | .069 | 3,500 | 0.0328 | 47 |
| 20 | .162 | 4,500 | 0.0328 | 87 |
| 21 | .147 | 4,500 | 0.0411 | 174 |
| 22 | .204 | 5,000 | 0.0411 | 107 |

TABLE III

| Example Number | Watt hrs./ sq. ft. | Volts | Sheeting-to-Electrode Gap, inch | Blocking millilb./in. |
|---|---|---|---|---|
| 23 | .0475 | 3,000 | 0.0183 | 63 |
| 24 | .157 | 4,000 | 0.0183 | 80 |
| 25 | .033 | 3,000 | 0.0308 | 70 |
| 26 | .079 | 3,500 | 0.0308 | 53 |
| 27 | .131 | 4,000 | 0.0308 | 194 |
| 28 | .042 | 3,000 | 0.0308 | 313 |
| 29 | .093 | 3,500 | 0.0308 | 54 |
| 30 | .150 | 4,000 | 0.0308 | 167 |
| 31 | .207 | 4,500 | 0.0308 | 81 |

TABLE IV

| Example Number | Watt hrs./ sq. ft. | Volts | Sheeting-to-Electrode Gap, inch | Blocking millilb./in. |
|---|---|---|---|---|
| 32 [1] (Air) | .328 | 5,100 | 0.02 | 492 |
| 33 [1] | .195 | 4,100 | 0.02 | 40 |

[1] Examples 32 and 33 were run at 15 kilocycles.

I claim:
1. In a process for the preparation of plasticized polyvinyl butyral sheeting suitable for use in the preparation of laminated safety glass, the step which comprises treating at least one surface with a high voltage electrical discharge.
2. The process of claim 1 in which the sheeting is subjected to between about .025 and 8 watt hours of energy per square foot of surface.
3. The process of claim 2 in which the sheeting is treated on both sides with between about 0.2 and 2.6 watt hours of energy per square foot of surface.
4. The process of claim 2 in which the sheeting is moving at a speed between 2 and 500 feet per minute during the treatment.
5. The process of claim 2 in which the sheeting is spaced from at least one electrode a distance of between 10 and 100 mil.

References Cited

UNITED STATES PATENTS 3,309,299   3/1967   Mantell _____ 204—165

ROBERT K. MIHALEK, *Primary Examiner.*